(12) United States Patent
Roth et al.

(10) Patent No.: US 9,133,322 B2
(45) Date of Patent: Sep. 15, 2015

(54) POLYAMIDE MOULDING COMPOUNDS AND USE THEREOF IN THE PRODUCTION OF MOULDED ARTICLES

(71) Applicant: EMS-PATENT AG, Domat/Ems (CH)

(72) Inventors: Mark D. Roth, Erndtebruck (DE); Nikolai Lamberts, Bonaduz (CH); Botho Hoffmann, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 74 days.

(21) Appl. No.: 13/800,102

(22) Filed: Mar. 13, 2013

(65) Prior Publication Data

US 2014/0094548 A1    Apr. 3, 2014

(30) Foreign Application Priority Data

Oct. 2, 2012 (EP) .................................... 12186929

(51) Int. Cl.
*C08K 5/42* (2006.01)
*C08L 77/02* (2006.01)
*C08L 77/06* (2006.01)

(52) U.S. Cl.
CPC . *C08K 5/42* (2013.01); *C08L 77/02* (2013.01); *C08L 77/06* (2013.01); *C08L 2205/02* (2013.01)

(58) Field of Classification Search
CPC ..... C08L 77/02; C08L 77/06; C08L 2205/02; C08K 5/42; C08K 5/0041; C08K 5/0083
USPC ......... 524/126, 128, 153, 159, 400, 413, 436, 524/437, 445, 451
See application file for complete search history.

(56) References Cited

U.S. PATENT DOCUMENTS

| | | |
|---|---|---|
| 2,516,585 A | 7/1950 | Pease |
| 3,454,536 A | 7/1969 | Schade et al. |
| 3,600,336 A | 8/1971 | Okada et al. |
| 3,625,788 A | 12/1971 | Bartner |
| 4,036,811 A | 7/1977 | Noetzel et al. |
| 4,076,664 A | 2/1978 | Pagilagan |
| 4,212,777 A | 7/1980 | Goletto |
| 4,322,260 A | 3/1982 | Conlon |
| 4,345,066 A | 8/1982 | Rüter |
| 4,413,921 A | 11/1983 | Fotiu et al. |
| 4,537,949 A | 8/1985 | Schmidt et al. |
| 4,540,772 A | 9/1985 | Pipper et al. |
| 4,603,166 A | 7/1986 | Poppe et al. |
| 4,607,073 A | 8/1986 | Sakashita et al. |
| 4,680,379 A | 7/1987 | Coquard et al. |
| 4,731,421 A | 3/1988 | Hoppe et al. |
| 4,826,951 A | 5/1989 | Coquard et al. |
| 4,831,106 A | 5/1989 | Kempter et al. |
| 4,831,108 A | 5/1989 | Richardson et al. |
| 4,847,356 A | 7/1989 | Hoppe et al. |
| 5,071,924 A | 12/1991 | Koch et al. |
| 5,081,222 A | 1/1992 | Reimann et al. |
| 5,098,940 A | 3/1992 | Brooks |
| 5,177,177 A | 1/1993 | Thullen et al. |
| 5,177,178 A | 1/1993 | Thullen et al. |
| 5,191,060 A | 3/1993 | Akkapeddi et al. |
| RE34,447 E | 11/1993 | Poppe et al. |
| 5,278,231 A | 1/1994 | Chundury |
| 5,302,691 A | 4/1994 | Soelch |
| 5,310,860 A | 5/1994 | Maj et al. |
| 5,342,862 A | 8/1994 | Reich |
| 5,422,418 A | 6/1995 | Maj et al. |
| 5,480,945 A | 1/1996 | Vicik |
| 5,560,398 A | 10/1996 | Pfleger |
| 5,612,446 A | 3/1997 | Presenz et al. |
| 5,674,973 A | 10/1997 | Pipper et al. |
| 5,684,120 A | 11/1997 | Torre |
| 5,686,192 A | 11/1997 | Presenz et al. |
| 5,688,901 A | 11/1997 | Fisch et al. |
| 5,708,125 A | 1/1998 | Liedloff et al. |
| 5,773,556 A | 6/1998 | Kleiner et al. |
| 5,786,086 A | 7/1998 | Frihart et al. |
| 5,807,972 A | 9/1998 | Liedloff et al. |
| 5,917,004 A | 6/1999 | Liedloff et al. |
| 5,957,607 A | 9/1999 | Tsai |
| 6,008,288 A | 12/1999 | Dalla Torre |
| 6,204,355 B1 | 3/2001 | Dalla Torre et al. |
| 6,255,371 B1 | 7/2001 | Schlosser et al. |
| 6,270,560 B1 | 8/2001 | Kleiner et al. |

(Continued)

FOREIGN PATENT DOCUMENTS

| | | |
|---|---|---|
| CA | 861620 | 1/1971 |
| CA | 2019904 | 1/1991 |

(Continued)

OTHER PUBLICATIONS

European Patent Office, Extended European Search Report in European Patent Application No. 12186929.1 (Mar. 4, 2013).

"BIAX, ein neuer Prüfkörper" (BIAX, a new inspection piece), published in Noss'Ovra staff magazine, Dec. 2006, No. 12, 29th year, EMS-CHEMIE AG (4 pgs.).

Cramer et al., "Some Isomorphous Copolyamides," *Journal of Polymer Science*, vol. 21, pp. 237-250 (1956).

Dolden, "Structure-property relationships in amorphous polyamides," *Polymer*, vol. 17, pp. 875-892 (1976).

Edgar et al., "The p-Phenylene Linkage in Linear High Polymers: Some Structure-Property Relationships," *Journal of Polymer Science*, vol. 8, No. 1, pp. 1-22 (1952).

Henkel Corporation, "Empol Dimer and Polybasic Acids: Technical Bulletin 114C," (1997).

(Continued)

*Primary Examiner* — Kriellion Sanders

(74) *Attorney, Agent, or Firm* — Leydig, Voit & Mayer, Ltd.

(57) ABSTRACT

The present invention relates to polyamide molding compounds, pigmented black, which include nigrosin and at least one nucleation agent, carbon black being ruled out. The present invention likewise relates to a method for producing molded articles from the mentioned polyamide molding compounds and also the corresponding molded articles. The polyamide molding compounds are used in the production of components with increased temperature requirements, e.g. in the automobile sector.

17 Claims, No Drawings

(56) References Cited

U.S. PATENT DOCUMENTS

| | | |
|---|---|---|
| 6,291,633 B1 | 9/2001 | Nakamura |
| 6,303,741 B1 | 10/2001 | Tanaka |
| 6,319,986 B1 | 11/2001 | Amimoto et al. |
| 6,365,071 B1 | 4/2002 | Jenewein et al. |
| 6,547,992 B1 | 4/2003 | Schlosser et al. |
| 6,572,295 B1 | 6/2003 | Chochoy et al. |
| 6,706,790 B1 | 3/2004 | Berliet |
| 6,881,477 B2 | 4/2005 | Presenz et al. |
| 6,943,231 B2 | 9/2005 | Bühler |
| 7,014,315 B2 | 3/2006 | Iori et al. |
| 7,217,767 B2 | 5/2007 | Aguirre et al. |
| 7,249,844 B2 | 7/2007 | Sakai |
| 7,258,929 B2 | 8/2007 | Kanda et al. |
| 7,427,430 B2 | 9/2008 | Rhee et al. |
| 7,723,411 B2 | 5/2010 | Schneider |
| 7,807,245 B2 | 10/2010 | Bersted et al. |
| 7,807,742 B2 | 10/2010 | Tanaka et al. |
| 7,811,671 B2 | 10/2010 | Bushelman et al. |
| 7,981,518 B2 | 7/2011 | Sato |
| 8,022,170 B2 | 9/2011 | Hoffmann et al. |
| 8,268,920 B2 | 9/2012 | Prusty et al. |
| 8,268,956 B2 | 9/2012 | Bühler et al. |
| 8,507,598 B2 | 8/2013 | Bühler et al. |
| 2001/0007888 A1 | 7/2001 | Asano |
| 2003/0018107 A1 | 1/2003 | Heinen et al. |
| 2003/0023008 A1 | 1/2003 | Uchida et al. |
| 2003/0126788 A1 | 7/2003 | Uang et al. |
| 2003/0130381 A1 | 7/2003 | Joachimi et al. |
| 2003/0181585 A1 | 9/2003 | Handlin, Jr. et al. |
| 2003/0235666 A1 | 12/2003 | Bühler et al. |
| 2004/0158028 A1 | 8/2004 | Bühler et al. |
| 2004/0230028 A1 | 11/2004 | Sato et al. |
| 2004/0242803 A1* | 12/2004 | Ohme et al. .................. 525/400 |
| 2005/0049339 A1 | 3/2005 | Knop et al. |
| 2005/0101708 A1 | 5/2005 | Knop et al. |
| 2006/0138391 A1 | 6/2006 | Drewes et al. |
| 2006/0235190 A1 | 10/2006 | Hoffmann et al. |
| 2006/0264542 A1 | 11/2006 | Schneider |
| 2007/0072970 A1 | 3/2007 | Schneider |
| 2007/0104971 A1 | 5/2007 | Wursche et al. |
| 2007/0123632 A1 | 5/2007 | Rexin et al. |
| 2007/0172614 A1 | 7/2007 | Lee |
| 2007/0222941 A1 | 9/2007 | Sakai |
| 2007/0270544 A1 | 11/2007 | Buhler et al. |
| 2008/0135720 A1 | 6/2008 | Buhler et al. |
| 2008/0167415 A1 | 7/2008 | Stoeppelmann et al. |
| 2008/0207782 A1 | 8/2008 | Jacobs et al. |
| 2008/0274355 A1 | 11/2008 | Hewel |
| 2009/0127740 A1 | 5/2009 | Kirchner |
| 2009/0131569 A1 | 5/2009 | Schwitter et al. |
| 2009/0163634 A1 | 6/2009 | Bühler et al. |
| 2009/0247699 A1 | 10/2009 | Buehler et al. |
| 2010/0022742 A1 | 1/2010 | Buhler et al. |
| 2010/0028646 A1 | 2/2010 | Schwitter et al. |
| 2010/0130677 A1 | 5/2010 | Amici et al. |
| 2010/0227122 A1 | 9/2010 | Kumazawa et al. |
| 2010/0279111 A1 | 11/2010 | Philipp et al. |
| 2010/0297373 A1 | 11/2010 | Thullen et al. |
| 2010/0311882 A1 | 12/2010 | Eibeck et al. |
| 2011/0105655 A1 | 5/2011 | Harder et al. |
| 2011/0220667 A1 | 9/2011 | Pfleghar et al. |
| 2012/0004353 A1 | 1/2012 | Prusty et al. |
| 2012/0029133 A1 | 2/2012 | Stoppelmann et al. |
| 2012/0237708 A1 | 9/2012 | Caviezel et al. |
| 2012/0321829 A1 | 12/2012 | Bayer et al. |
| 2013/0317168 A1 | 11/2013 | Bühler |
| 2014/0171573 A1 | 6/2014 | Bayer et al. |
| 2014/0275392 A1 | 9/2014 | Bühler |

FOREIGN PATENT DOCUMENTS

| | | |
|---|---|---|
| CH | 280367 | 1/1952 |
| DE | 14 95 393 | 4/1969 |
| DE | 24 47 727 A1 | 4/1976 |
| DE | 26 42 244 A1 | 3/1977 |
| DE | 36 00 015 A1 | 7/1986 |
| DE | 90 01 242 U1 | 2/1991 |
| DE | 40 05 894 A1 | 12/1991 |
| DE | 43 29 676 A1 | 3/1994 |
| DE | 195 13 940 A1 | 1/1996 |
| DE | 195 37 614 A1 | 4/1997 |
| DE | 199 20 276 A1 | 11/2000 |
| DE | 199 33 901 A1 | 2/2001 |
| DE | 102 24 947 A1 | 12/2003 |
| DE | 102 59 048 A1 | 7/2004 |
| DE | 696 32 529 T2 | 9/2004 |
| DE | 103 16 873 A1 | 11/2004 |
| DE | 103 46 326 A1 | 5/2005 |
| DE | 694 28 832 T3 | 2/2007 |
| DE | 102010023770 A1 | 12/2011 |
| EP | 0 052 944 A1 | 6/1982 |
| EP | 0 129 195 A2 | 12/1984 |
| EP | 0 129 196 A2 | 12/1984 |
| EP | 0 196 981 A1 | 10/1986 |
| EP | 0 246 620 A2 | 11/1987 |
| EP | 0 288 269 A1 | 10/1988 |
| EP | 0 299 444 A2 | 1/1989 |
| EP | 0 325 923 A2 | 8/1989 |
| EP | 0 360 611 A2 | 3/1990 |
| EP | 0 376 616 B1 | 7/1990 |
| EP | 0 410 301 A1 | 1/1991 |
| EP | 0 449 466 A1 | 10/1991 |
| EP | 0 469 435 A1 | 2/1992 |
| EP | 0 508 054 A2 | 10/1992 |
| EP | 0 550 314 A1 | 7/1993 |
| EP | 0 550 315 A1 | 7/1993 |
| EP | 0 659 534 A2 | 6/1995 |
| EP | 0 693 515 A1 | 1/1996 |
| EP | 0 699 708 A2 | 3/1996 |
| EP | 0 725 101 A1 | 8/1996 |
| EP | 0 792 912 A2 | 9/1997 |
| EP | 0 796 886 A2 | 9/1997 |
| EP | 0 818 491 A2 | 1/1998 |
| EP | 0 725 100 B1 | 3/1998 |
| EP | 0 837 087 A1 | 4/1998 |
| EP | 0 976 774 A2 | 2/2000 |
| EP | 0 771 846 B1 | 1/2002 |
| EP | 1 369 447 A1 | 12/2003 |
| EP | 1 475 403 A1 | 11/2004 |
| EP | 1 548 059 A1 | 6/2005 |
| EP | 1 630 590 A1 | 3/2006 |
| EP | 1 712 581 A1 | 10/2006 |
| EP | 1 752 492 A1 | 2/2007 |
| EP | 1 845 123 A1 | 10/2007 |
| EP | 1 942 296 A1 | 7/2008 |
| EP | 1 972 659 A1 | 9/2008 |
| EP | 2 060 596 A1 | 5/2009 |
| EP | 2 060 607 A1 | 5/2009 |
| EP | 2 082 861 A1 | 7/2009 |
| EP | 1 474 459 B1 | 11/2009 |
| EP | 2 365 033 A1 | 9/2011 |
| EP | 2 412 757 A1 | 2/2012 |
| GB | 766927 | 1/1957 |
| GB | 1 538 188 A | 1/1979 |
| GB | 1548431 | 7/1979 |
| JP | 54-071191 A | 6/1979 |
| JP | 61-200125 A | 9/1986 |
| JP | 63-023927 A | 2/1988 |
| JP | 02-302440 A | 12/1990 |
| JP | 03-050264 A | 3/1991 |
| JP | H05-043799 A | 2/1993 |
| JP | 05-125184 A | 5/1993 |
| JP | 06-511281 T | 12/1994 |
| JP | 08-239469 A | 8/1996 |
| JP | 08-259808 A | 10/1996 |
| JP | 09-078351 A | 3/1997 |
| JP | 10-168183 A | 6/1998 |
| JP | 10-219026 | 8/1998 |
| JP | H11-279399 A | 10/1999 |
| JP | 2000-204239 A | 7/2000 |
| JP | 2001-261973 | 9/2001 |
| JP | 2004-083858 | 3/2004 |
| JP | 2006-045390 | 2/2006 |

(56) References Cited

FOREIGN PATENT DOCUMENTS

| | | |
|---|---|---|
| JP | 2009-132908 A | 6/2009 |
| JP | 2009-149896 A | 7/2009 |
| KR | 2011-0103425 A | 9/2011 |
| WO | WO 90/02017 A1 | 3/1990 |
| WO | WO 92/01389 A1 | 2/1992 |
| WO | WO 92/10525 A1 | 6/1992 |
| WO | WO 94/29367 A1 | 12/1994 |
| WO | WO 95/01389 A1 | 1/1995 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |
| WO | WO 02/090421 A2 | 11/2002 |
| WO | WO 2004/055084 A2 | 7/2004 |
| WO | WO 2004/078848 A1 | 9/2004 |
| WO | WO 2004/090036 A1 | 10/2004 |
| WO | WO 2006/074934 A1 | 7/2006 |
| WO | WO 2006/122602 A1 | 11/2006 |
| WO | WO 2007/080754 A1 | 7/2007 |
| WO | WO 2007/087896 A1 | 8/2007 |
| WO | WO 2009/062692 A2 | 5/2009 |
| WO | WO 2009/095440 A1 | 8/2009 |
| WO | WO 2009/156323 A2 | 12/2009 |

OTHER PUBLICATIONS

Laura et al., "Effect of rubber particle size and rubber type on the mechanical properties of glass fiber reinforced, rubber-toughened nylon 6," *Polymer*, vol. 44, No. 11, pp. 3347-3361 (2003).

Levine et al., "Isomorphous Replacement in a Copolyamide System," *Journal of Polymer Science*, Issue XLIX, pp. 241-246 (1961).

Unichema International, "Pripol C36-Dimer Acid," (published prior to Dec. 17, 2003—exact date unknown).

Yu et al., "Isomorphous Replacement in a Copolyamide System: Homologs of Adipic and Terephthalic Acids," *Am. Chem. Soc.*, Issue 81, pp. 5361-5365 (1959).

Korean Intellectual Property Office, Reasons for Rejection & Comments in Korean Patent Application No. 10-2013-0117658 (May 8, 2015).

\* cited by examiner

POLYAMIDE MOULDING COMPOUNDS AND USE THEREOF IN THE PRODUCTION OF MOULDED ARTICLES

CROSS-REFERENCE TO A RELATED APPLICATION

This application claims the benefit of European Patent Application No. 12 186 939.1, filed Oct. 2, 2012, the disclosure of which is incorporated herein by reference.

The present invention relates to polyamide moulding compounds, pigmented black, which include nigrosin and at least one nucleation agent, carbon black being ruled out. The present invention likewise relates to a method for producing moulded articles from the mentioned polyamide moulding compounds and also the corresponding moulded articles. The polyamide moulding compounds are used in the production of components with increased temperature requirements, e.g. in the automobile sector.

It is known for partially crystalline polymers that these partially crystallise out of the melt during cooling. This crystallisation is normally initiated by the vessel walls, dust or aids, such as pigments etc. If the crystallisation is effected uniformly around the nucleus, then spherulites are produced. The larger these spherulites are, the more unfavourable is the mechanical behaviour of the plastic material, e.g. a moulded article produced herefrom is more susceptible to breaking. Therefore an increase in the number of nuclei is desirable. Likewise, the cycle time during processing is thus reduced since the plastic material becomes solid more rapidly. For this reason, so-called nucleation agents are added to the polymer in the melt.

A known additive which is used in the field of polyamides is nigrosin. This hereby concerns a mixture of synthetic black colourants which can be produced from a mixture of nitrobenzene, aniline and anilinehydrochloride in the presence of a copper- or iron catalyst. Nigrosin is frequently used for the pigmentation of polyamides, for example because of its surface-modifying effect.

Furthermore, the addition of carbon black as colourant is known in the case of polyamides, also the weathering resistance being able to be improved as a result since UV radiation can be reflected or absorbed by carbon black.

Polyamide moulding compounds, in which a combination of nigrosin and carbon black is used, are likewise already known from the state of the art.

Thus EP 0 052 944 A1 describes polyamide compositions which comprise carbon black and nigrosin. These have higher breaking elongation and impact strength than polyamide compositions which comprise merely carbon black. Examples with PA 66, nigrosin, carbon black and PA 6 (via a carbon black masterbatch) are cited.

EP 0 796 886 A2 concerns black polyamide compositions which comprise a polyamide and colourants which include carbon black, nigrosin and aniline black. These polyamide compositions have a good appearance, good surface gloss and good mechanical properties.

DE 696 32 529 T2 relates to light-stabilised polyamide compositions based on polyamide which include a black pigment. Furthermore, the compositions comprise nigrosin as crystallisation retardant.

These systems known from the state of the art have however the disadvantage that they have a heat ageing resistance which is too low for many applications.

The object of the present invention hence resided in providing moulding compounds, the mechanical properties of which, relative to the moulding compounds known from the state of the art, are improved after long-term heat stressing and are suitable in particular for components with increased temperature requirements. In addition, moulding compounds which have lower surface roughnesses than the moulding compounds from the state of the art are intended to be provided.

This object is achieved by the features of the polyamide moulding compounds, the method for producing moulded articles, the moulded articles described herein, and the advantageous developments thereof. Uses according to the invention are also described.

According to the invention, a polyamide moulding compound having the following composition is provided:
- (a) 20 to 99% by weight of at least one polyamide,
- (b) 0.05 to 5% by weight of nigrosin,
- (c) 0.005 to 2% by weight of at least one nucleation agent,
- (d) 0 to 80% by weight of at least one additive or supplement.

Components (a) to (d) hereby add up in total to 100% by weight of the polyamide moulding compound, the presence of carbon black in the polyamide moulding compound being ruled out.

The moulding compounds according to the invention relative to the moulding compounds known from the state of the art have improved heat ageing resistance and lower surface roughness.

Preferably, the polyamide (a) is selected from the group consisting of PA 6; PA 4.6; PA 6.6; PA 6.6/6; PA 6.10; PA 6.12; PA 10.10; PA 11; PA 12; PA MXD.6 (MXD=meta-xylylenediamine); PA MXD.10; PA MACM.12; PA PACM.12; PA 6.T/6.I; PA 6.T/6.6; PA 6.T/6.12; PA 6.T/10.12; PA 4.T; PA 9.T; PA 10.T; PA 12.T; PA 10/6.T; PA 6.T/6.I/6.6; PA 11/10.T; PA 12/10.T; PA 6.10/10.T; PA 6.12/10T; PA 10.10/10T; PA 10.12/10.T; PA 12.12/10T; PA 11/10.T/12; PA 11/10.T/6; PA 12/10.T/6; PA 11/10.T/10.I; PA 11/10.T/10.6; PA 12/10.T/10.I; PA 12/10.T/10.6; PA 6.T/MPMD.T (PAMPMDT=polyamide made of a mixture of hexamethylenediamine and 2-methyl pentamethylenediamine as diamine component and terephthalic acid as diacid component); polyamides, the diamine building block of which is PACM (PACM=4,4'-diaminocyclohexylmethane, MACM (MACM=3,3'-dimethyl-4,4'-diaminocyclohexylmethane), CHDA (CHDA=cyclohexyldiamine), or TMDC (TMDC=tetramethyldicykan); and mixtures thereof. Polyamide (a) is for particular preference a blend of PA 6 and PA 66.

The polyamide moulding compound preferably comprises between 24.20 and 98.9125% by weight, particularly preferably between 31.50 and 94.89% by weight and for particular preference between 38.00 and 84.75% by weight of polyamide.

A further preferred embodiment provides that the at least one nucleation agent (c) is selected from the group consisting of high-melting polyamides, talc, clay minerals and/or mixtures thereof, in particular nucleation agents based on PA 2.2, kaolinite and steatite. There are included herein, in particular the polyamide 2.2 Brüggolen® P22 and the steatite Mikrotalk IT Extra. However it is also possible to use other known nucleation agents, carbon black being however expressly ruled out.

The nucleation agents preferably have a particle size (d0.5) in the range of 1 μm to 20 μm, particularly preferred from 5 μm to 12 μm.

The nucleation agents of the present invention increase the solidification rate which was measured as described in the experimental part, relative to a moulding compound which comprises only components (a), (b) and optionally (d) according to the invention, by at least 10%, preferably by at least 30% and particularly preferred by at least 100%.

The polyamide moulding compound according to the invention preferably comprises 0.08 to 4% by weight, preferably in 0.1 to 2% by weight and particularly preferred in 0.2 to 1.5% by weight of nigrosin (b).

The polyamide moulding compound preferably comprises 0.0075 to 1.8% by weight, preferably in 0.01 to 1.5% by weight and particularly preferred in 0.05 to 0.5% by weight of the at least one nucleation agent (c).

There can be comprised as additive or supplement (d), components selected from the group consisting of glass fibres, glass balls, carbon fibres, mineral powders, UV stabilisers, heat stabilisers, lubricants and mould-release agents, impact modifiers and mixtures hereof, glass fibres are particularly preferred. The additives do not act as nucleation agent in the sense of the present invention.

Heat stabilisers in the sense of the present invention are metallic salts, phenolic antioxidants; aminic antioxidants; phosphites; phosphonites; and/or mixtures thereof. The following list of heat stabilisers should not be regarded as restrictive.

Metallic salts are thereby for example, copper(I) iodide and other copper halogenides; mixtures of copper halogenides and potassium iodide or other halogenides of main group I; iron(II) salts, such as e.g. $FeCl_2$, $Fe(SO_4)$ and $Fe_3O_4$; iron(III) salts, such as e.g. $Fe_2(SO_4)_3$, $FeCl_3$ and $Fe_2O_3$; other transition metallic salts, e.g. salts of vanadium, niobium, tantalum, chromium, molybdenum, tungsten, osmium, cobalt, rhodium, iridium, palladium, platinum and nickel, preferably copper halogenides are used in combination with potassium halogenides and, for particular preference, a mixture of copper(I) iodide and potassium iodide is used, the molar ratio of potassium iodide to copper iodide being 0.5 to 20, preferably 1 to 18 and particularly preferred 3 to 15.

Preferred aminic antioxidants are secondary aromatic amines, such as adducts of phenylenediamine with acetone (Naugard A); adducts of phenylenediamine with linolene; Naugard 445, N,N'-dinaphthyl-p-phenylenediamine; N-phenyl-N'-cyclohexyl-p-phenylenediamine; blends of reaction products made of an adduct of a ketone and N,N'-diphenyl-p-phenylenediamine and or mixtures of two or more thereof or blends of diarylamine-ketone adducts and N,N'-diphenyl-p-phenylenediamine, blends of diarylamine-ketone adducts and N,N'-diphenyl-p-phenylenediamine being preferred.

Preferred phenolic antioxidants are sterically hindered phenols, such as N,N'-hexamethylene-bis-3-(3,5-di-tert-butyl-4-hydroxyphenyl)-propionamide, bis-(3,3-bis-(4'-hydroxy-3'-tert-butylphenyl)-butanoic acid)-glycolester, 2,1'-thioethylbis-(3-(3,5-di-tert-butyl-4-hydroxyphenyl)-propionate, 4,4'-butylidene-bis-(3-methyl-6-tert-butylphenol), triethyleneglycol-3-(3-tert-butyl-4-hydroxy-5-methylphenyl)-propionate or mixtures of two or more of these stabilisers.

Preferred phosphites and phosphonites are triphenylphosphite, diphenylalkylphosphite, phenyldialkylphosphite, tris(nonylphenyl)phosphite, trilaurylphosphite, trioctadecylphosphite, distearylphentaerythritoldiphosphite, tris(2,4-di-tert-butylphenyl)phosphite, diisodecylpentaerythritoldiphosphite, bis(2,4-di-tert-butylphenyl)pentaerythritoldiphosphite, bis(2,6-di-tert-butyl-4-methylphenyl)-pentaerythritoldiphosphite, diisodecyloxy-pentaerythritol-diphosphite, bis(2,4-di-tert-butyl-6-methylphenyl)pentaerythritoldiphospite, bis(2,4,6-tris-(tert-butylphenyl))pentaerythritol-diphosphite, tristearylsorbitol-triphosphite, tetrakis(2,4-di-tert-butylphenyl)-4,4'-biphenylenediphosphonite, 6-isooctyloxy-2,4,8,10-tetra-tert-butyl-12H-dibenzo-[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl) methylphosphite and bis(2,4-di-tert-butyl-6-methylphenyl) ethylphosphite. Particularly preferred are tris[2-tert-butyl-4-thio(2'-methyl-4'-hydroxy-5'-tert-butyl)-phenyl-5-methyl] phenyl-phosphite and tris(2,4-di-tert-butylphenyl)phosphite (Hostanox® PAR24: commercial product of the company Clariant, Basel).

In a preferred embodiment, a mixture of copper(I) iodide and potassium iodide is used. A particularly preferred embodiment provides the use of an aminic antioxidant and a mixture of copper(I) iodide and potassium iodide.

It is further preferred that the at least one additive (d) is comprised in a quantity of 1.0 to 70% by weight, preferably in 5 to 65% by weight and particularly preferred in 15 to 60% by weight.

The quantity proportion of heat stabiliser, relative to the total quantity of the polyamide moulding compound, is preferably 0.01 to 5% by weight, particularly preferred 0.05 to 5% by weight and for particular preference 0.1 to 2% by weight.

A preferred polyamide moulding compound has the following composition:
(a1) 0.4 to 14% by weight of PA 6
(a2) 26 to 97% by weight of PA 66 or a polyphthalamide
(b) 0.4 to 2% by weight of nigrosin,
(c) 0.1 to 2% by weight of at least one nucleation agent,
(d) 0.1 to 80% by weight of at least one additive or supplement.

Components (a) to (d) add up in total to 100% by weight of the polyamide moulding compound and carbon black must not be contained in the moulding compound.

In a further preferred embodiment, the moulding compound comprises 0.4 to 16% by weight, particularly preferred 0.5 to 14% by weight and for particular preference 0.6 to 13% by weight of PA 6.

If the polyamide moulding compound is aliphatic, this has, after 2,000 h high-temperature ageing at 230° C., a tensile strength at break, determined according to ISO 527, preferably of at least 60%, preferably of at least 65% and particularly preferred of at least 72%, relative to the value, determined according to ISO 527, for the tensile strength at break before the high-temperature ageing. The elongation at break determined according to the same methodology, after 2,000 h high-temperature ageing at 230° C., is preferably at least 50%, preferably at least 55% and particularly preferred at least 58%, relative to the value, determined according to ISO 527, for the elongation at break before the high-temperature ageing.

If the polyamide moulding compound is partly aromatic, this has, after 3,000 h high-temperature ageing at 180° C., a tensile strength at break, determined according to ISO 527, preferably of at least 69%, relative to the value, determined according to ISO 527, for the elongation at break before the high-temperature ageing. The elongation at break, determined according to the same methodology, after 3,000 h high-temperature ageing at 180° C. is preferably at least 63%, preferably at least 67% and particularly preferred at least 71%, relative to the value, determined according to ISO 527, for the elongation at break before the high-temperature ageing.

According to the invention, a method is likewise provided for producing moulded articles, in particular automobile components for use close to the engine, made of a polyamide moulding compound, the above-described polyamide moulding compound according to the invention being extruded or injection-moulded.

Moulded articles for parts with increased temperature requirements up to 230° C. are likewise provided, in particular automobile components for use close to the engine, which were produced from the above-described polyamide moulding compound according to the invention.

The polyamide moulding compounds according to the invention are used in the production of components with increased temperature requirements up to 230° C., in particular for automobile components for use close to the engine, such as charge cooling side parts, suction systems, oil sumps, injection nozzles etc.

The moulding compounds and moulded articles according to the invention are intended to be specified in more detail with reference to the subsequent examples without restricting these to the specific embodiments shown here.

EXAMPLES

The materials listed in Table 1 were used in the examples and comparative examples.

TABLE 1

| Material | Trade name | Supplier | $H_2O$ content [% by wt.] | Relative viscosity |
|---|---|---|---|---|
| PA 66 | Radipol A45 | Radici (IT) | 0.25 | 2.70[d] |
| PA 6 | Grilon F26 | EMS-CHEMIE AG (CH) | 0.04 | 2.64[d] |
| PA 6.T/6.I | XE 3733NK | EMS-CHEMIE AG (CH) | 0.05 | 1.54[e] |
| Copper iodide | — | William Blythe (UK) | — | — |
| KI/Ca-stearate (ratio 98:2) | — | AJAY Europe S.A.R.L. (FR)[f] | — | — |
| Ca-stearate | Ligastar CA 800 | Greven (DE) | — | — |
| Stabiliser mixture[a] | — | Greven (DE), William Blythe (UK), Chemtura (BE), Brüggemann Chem. (DE) | — | — |
| Nucleation agent 1 | Brüggolen® P22 | Brüggemann Chem. (DE) | — | — |
| Nucleation agent 2 | Mikrotalk IT Extra | Plüss-Staufer (CH) | — | — |
| Nucleation agent 3 | Kaolin | Imerys Performance & Filtration Minerals (UK) | — | — |
| Nigrosin-comprising black masterbatch[b] | PA N 54/1033 | Colloids (UK) | — | — |
| Carbon black-comprising black masterbatch[c] | MB XE 3846 | EMS-CHEMIE AG (CH) | — | — |
| Glass fibres | Vetrotrex 995 EC10-4.5 | OCV (FR) | — | — |

[a] mixture of commercially available stabilisers which do not have a nucleating effect
[b] masterbatch with a nigrosin proportion of 40% by weight
[c] masterbatch with a carbon black proportion of 15% by weight
[d] determined according to ISO 307 (1 g polyamide in 100 ml sulphuric acid), calculation of the relative viscosity (RV) according to $RV = t/t_0$ following section 11 of the standard;
[e] determined according to ISO 307 (0.5 g polyamide in 100 ml m-cresol), calculation of the relative viscosity (RV) according to $RV = t/t_0$ following section 11 of the standard;
[f] supplier of KI, mixture with Ca-stearate is effected at EMS The moulding compounds for examples Ex. 1, Ex. 2 and Ex. 3 according to the invention and for the comparative examples Comp. ex. 1 to Comp. ex. 5 were produced on a twin-screw extruder by the company Werner and Pfleiderer, Type ZSK25. The quantity proportions of initial substances, indicated in Table 2, in percent by weight (% by weight) relative to 100% by weight of the total moulding compound were compounded in the twin-screw extruder.

TABLE 2

| Composition | Ex. 1 | Ex. 2 | Ex. 3 | Comp. ex. 1 | Comp. ex. 2 | Comp. ex. 3 | Ex. 4 | Comp. ex. 4 |
|---|---|---|---|---|---|---|---|---|
| PA 66 | 54.564 | 54.244 | 54.244 | 54.644 | 54.404 | — | — | — |
| PA 6 | 12.741 | 12.961 | 12.961 | 12.761 | 13.001 | — | — | — |
| 6.T/6.I | — | — | — | — | — | 47.625 | 48.625 | 45.625 |
| Ca-stearate | 0.50 | 0.50 | 0.50 | 0.50 | 0.50 | — | — | — |
| Copper iodide | 0.035 | 0.035 | 0.035 | 0.035 | 0.035 | 0.025 | 0.025 | 0.025 |
| KI/Ca-stearate (ratio 98:2) | 0.21 | 0.21 | 0.21 | 0.21 | 0.21 | 0.15 | 0.15 | 0.15 |
| Stabiliser mixture | 0.35 | 0.35 | 0.35 | 0.35 | 0.35 | — | — | — |
| Nucleation agent 1 | 0.10 | — | 0.20 | — | — | — | — | — |
| Nucleation agent 2 | — | 0.20 | — | — | — | — | — | — |
| Nucleation agent 3 | — | — | — | — | — | 0.20 | 0.20 | 0.20 |
| Nigrosin-comprising black masterbatch | 1.5 | 1.5 | 1.5 | 1.5 | 1.5 | — | 1.0 | 2.0 |
| Carbon black-comprising black masterbatch | — | — | — | — | — | 2.0 | — | 2.0 |
| Glass fibres | 30.0 | 30.0 | 30.0 | 30.0 | 30.0 | 50.0 | 50.0 | 50.0 |
| Surface roughness | + | + | + | + | + | − | + | − |
| Solidification rate [J/(g * min)] | 31.3 | not det. | not det. | 14.8 | not det. | not det. | not det. | not det. |

The three compositions Ex. 1, Ex. 2 and Ex. 3 according to the invention were varied with respect to the type (Brüggolen® P22 or Mikrotalk IT Extra) and quantity (0.1 or 0.2% by weight) of the nucleation agent. The comparative example Comp. ex. 1 has the same composition as example Ex. 1 according to the invention, however without nucleation agent. Comparative example Comp. ex. 2 has the same composition as examples Ex. 2 and Ex. 3 according to the invention, however without nucleation agent.

In Table 3, the mechanical properties of the compositions according to examples 1 to 3 and comparative examples 1 to 2 are listed. Here, the mechanical properties (MP) were determined after a high-temperature ageing at 230° C.

In addition, a study relating to the use of carbon black in nigrosin-comprising, nucleated PA moulding compounds was carried out. The corresponding mechanical data after ageing at 180° C. are compiled in Table 4, evaluation of the surface roughness was effected in Table 2.

Assessment of the Surface Roughness

Assessment of the surface roughness was effected visually with the naked eye. The examples and comparative examples characterised with (+) have low surface roughness and no uneven areas can be detected on the surface, whereas with the examples and comparative examples characterised with (−) uneven areas were perceived.

The mechanical data indicated in Table 3 and 4 were determined according to the following standards:

Modulus of Elasticity in Tension:
ISO 527 with a tension rate of 1 mm/min
ISO tension test bar, Standard: ISO 3167, Type A, 170×20/10×4 mm, temperature 23° C.

Tensile Strength at Break and Elongation at Break:
ISO 527 with a tension rate of 5 mm/min
ISO tension test bar, Standard: ISO 3167, Type A, 170×20/10×4 mm, temperature 23° C.

High-Temperature Ageing

The high-temperature ageings were implemented in ventilated, electrically heated single chamber hot cabinets according to IEC 60216-4-1 at 180° C. or 230° C. on ISO tension test bars (Standard: 3167, Type A, 170×20/10×4 mm). After the times indicated in Table 3, sample pieces were removed from the oven and tested according to the above-indicated methods after cooling to 23° C.

Determination of the Solidification Rate

The solidification rate in J/(g*min) was determined on a DSC Q2000 (Differential Scanning calorimeter) of the company TA Instruments. Nitrogen was used as flushing gas and, as calibration substances, indium ($Smp_{onset}$: 156.6° C., ΔH: 28.45 J/g) and zinc ($Smp_{onset}$: 419.5° C., ΔH: 108.37 J/g). 10 mg of the sample was weighed into a crucible made of aluminium and the latter was sealed. The sample was then heated firstly at 20 K/minute to 320° C. and, after a minute, was cooled isothermally, at 5 K/minute to 50° C. During the heating and cooling process, the heat flow in W/g was thereby recorded over the entire temperature range of 50 to 320° C. Subsequently, the width of the crystallisation peak was determined by applying tangents with the programme Universal Analysis by TA Instruments at the peak. From the temperature range in K and the cooling rate of 5 K/min, corresponding to the peak width, the "time for the crystallisation process" in minutes was determined by computer. The integral under the area of the peak corresponds to the "crystallisation enthalpy" in J/g and was determined with the programme Universal Analysis by TA Instruments. The solidification rate in J/(g*min) corresponds to the quotient of the "crystallisation enthalpy" and the "time for the crystallisation process".

TABLE 3

|  | Ex. 1 | Ex. 2 | Ex. 3 | Comp. ex. 1 | Comp. ex. 2 |
|---|---|---|---|---|---|
| MP (after 0 h) | | | | | |
| tensile modulus [MPa] | 9825 | 8593 | 9226 | 9575 | 8774 |
| tensile strength at break [MPa] | 197 | 168 | 176 | 197 | 170 |
| elongation at break [%] | 3.2 | 3.9 | 3.9 | 3.3 | 3.9 |
| MP (after 250 h) | | | | | |
| tensile modulus [MPa] | 10350 | 9486 | 10057 | 10010 | 9540 |
| tensile strength at break [MPa] | 183 | 168 | 180 | 190 | 175 |
| elongation at break [%] | 2.2 | 3.0 | 3.3 | 2.5 | 2.3 |
| MP (after 500 h) | | | | | |
| tensile modulus [MPa] | 10605 | 9796 | 10363 | 11180 | 9975 |
| tensile strength at break [MPa] | 144 | 167 | 178 | 123 | 168 |
| elongation at break [%] | 1.6 | 3.0 | 3.2 | 1.3 | 3.2 |
| MP (after 1,000 h) | | | | | |
| tensile modulus [MPa] | 10195 | 9630 | 9777 | 9495 | 9774 |
| tensile strength at break [MPa] | 145 | 164 | 174 | 121 | 168 |
| elongation at break [%] | 1.6 | 2.9 | 3.4 | 1.4 | 3.0 |
| MP (after 1,500 h) | | | | | |
| tensile modulus [MPa] | 10095 | 10220 | 10918 | 9535 | 10432 |
| tensile strength at break [MPa] | 145 | 170 | 181 | 120 | 173 |
| elongation at break [%] | 1.7 | 3.0 | 3.1 | 1.4 | 3.4 |
| MP (after 2,000 h) | | | | | |
| tensile modulus [MPa] | 9285 | 10240 | 10849 | 8495 | 10256 |
| tensile strength at break [MPa] | 144 | 167 | 178 | 113 | 141 |
| tensile strength at break rel. to initial value [%] | 73 | 99 | 101 | 57 | 83 |
| elongation at break [%] | 1.9 | 3.3 | 3.3 | 1.6 | 1.8 |
| elongation at break rel. to initial value [%] | 59 | 85 | 85 | 48 | 46 |

TABLE 3-continued

|  | Ex. 1 | Ex. 2 | Ex. 3 | Comp. ex. 1 | Comp. ex. 2 |
|---|---|---|---|---|---|
| MP (after 3,000 h) | | | | | |
| tensile modulus [MPa] | 8425 | not det. | not det. | 5995 | not det. |
| tensile strength at break [MPa] | 134 | not det. | not det. | 83 | not det. |
| tensile strength at break rel. to initial value [%] | 68 | | | 42 | |
| elongation at break[%] | 2.0 | not det. | not det. | 1.7 | not det. |
| elongation at break rel. to initial value [%] | 63 | | | 52 | | not det. = not determined

TABLE 4

|  | Comp. ex. 3 | Ex. 4 | Comp. ex. 4 |
|---|---|---|---|
| MP (after 0 h) | | | |
| tensile modulus [MPa] | 18353 | 17425 | 18697 |
| tensile strength at break [MPa] | 268 | 268 | 269 |
| elongation at break [%] | 2.1 | 2.1 | 2.1 |
| MP (after 500 h) | | | |
| tensile modulus [MPa] | 19511 | 18948 | 20053 |
| tensile strength at break [MPa] | 231 | 243 | 228 |
| elongation at break [%] | 1.5 | 1.7 | 1.5 |
| MP (after 1,000 h) | | | |
| tensile modulus [MPa] | 19770 | 18938 | 20116 |
| tensile strength at break [MPa] | 212 | 223 | 209 |
| elongation at break [%] | 1.4 | 1.6 | 1.3 |
| MP (after 2,000 h) | | | |
| tensile modulus [MPa] | 19364 | 18716 | 19738 |
| tensile strength at break [MPa] | 202 | 199 | 186 |
| tensile strength rel. to initial value [%] | 75 | 74 | 69 |
| elongation at break [%] | 1.3 | 1.4 | 1.2 |
| elongation at break rel. to initial value [%] | 62 | 67 | 57 |
| MP (after 3,000 h) | | | |
| tensile modulus [MPa] | 18657 | 18270 | 19632 |
| tensile strength at break [MPa] | 183 | 184 | 161 |
| tensile strength rel. to initial value [%] | 68 | 69 | 60 |
| elongation at break [%] | 1.3 | 1.5 | 1.1 |
| elongation at break rel. to initial value [%] | 62 | 71 | 52 |

It emerges from the studies carried out by the inventors that polyamide moulding compounds which, in addition to nigrosin, also comprise at least one nucleation agent have improved heat ageing resistance. In addition, it was shown that carbon black in combination with nigrosin is not able to resolve the object according to the invention, namely making available a polyamide moulding compound with improved heat ageing resistance and low surface roughness. The use of carbon black increases the surface roughness and, for the combination of nigrosin and carbon black, even poorer long-term heat resistances are obtained than when carbon black or nigrosin are used alone.

The invention claimed is:

1. A polyamide moulding compound having the following composition:
(a) 20 to 99% by weight of at least one polyamide selected from the group consisting of PA 6; PA 4.6; PA 66; PA 66/6; PA 6.10; PA 6.12; PA 10.10; PA 11; PA 12; PA MXD.6; PA MXD.10; PA MACM.12; PA PACM.12; PA 6.T/6.I; PA 6.T/66; PA 6.T/6.12; PA 6.T/10.12; PA 4.T; PA 9.T; PA 10.T; PA 12.T; PA 10/6.T; PA 6.T/6.I/66; PA 11/10.T; PA 12/10.T; PA 6.10/10.T; PA 6.12/10T; PA 10.10/10T; PA 10.12/10.T; PA 12.12/10T; PA 11/10.T/12; PA 11/10.T/6; PA 12/10.T/6; PA 11/10.T/10.I; PA 11/10.T/10.6; PA 12/10.T/10.I; PA 12/10.T/10.6; a polyamide made of a mixture of hexamethylenediamine and 2-methyl pentamethylene-diamine as diamine component and terephthalic acid as diacid component; polyamides, the diamine building block of which is 4,4'-diaminocyclohexylmethane, 3,3'-dimethyl-4,4'-diaminocyclohexylmethane, cyclohexyldiamine or tetramethyldicykan and/or mixtures or blends thereof,
(b) 0.05 to 5% by weight of nigrosin,
(c) 0.005 to 2% by weight of at least one nucleation agent, wherein the at least one nucleation agent is polyamide PA 2.2,
(d) 0 to 79.945% by weight of at least one additive or supplement, wherein the at least one additive or supplement does not act as nucleation agent,
wherein components (a) to (d) add up in total to 100% by weight of the polyamide moulding compound and carbon black is not a component of the polyamide moulding compound.

2. The polyamide moulding compound according to claim 1, wherein polyamide (a) is a blend of PA 6 and PA 66 or of PA 6 and polyphthalamide.

3. The polyamide moulding compound according to claim 1, wherein polyamide (a) comprises 0.4 to 16% by weight of PA 6.

4. The polyamide moulding compound according to claim 1, wherein nigrosin (b) is comprised in 0.08 to 4% by weight.

5. The polyamide moulding compound according to claim 1, wherein the at least one nucleation agent (c) is comprised in 0.01 to 1.5% by weight.

6. The polyamide moulding compound according to claim 1, wherein the at least one additive or the supplement (d) is selected from the group consisting of glass fibres; glass balls; carbon fibres; mineral powders; UV stabilisers; heat stabilisers, in particular metallic salts, phenolic antioxidants; aminic antioxidants; phosphites, phosphonites; and/or mixtures thereof, a mixture of copper(I) iodide and potassium iodide, and an aminic antioxidant; lubricants and mould-release agents, impact modifiers and/or mixtures thereof.

7. The polyamide moulding compound according to claim 1, wherein the at least one additive (d) is comprised in 1.0 to 70% by weight.

8. The polyamide moulding compound according to claim 1, having the following composition:
(a1) 0.4 to 14% by weight of PA 6,
(a2) 26 to 97% by weight of PA 66 or a polyphthalamide,
(b) 0.4 to 2% by weight of nigrosin,
(c) 0.1 to 2% by weight of the at least one nucleation agent, and
(d) 0.1 to 73.1% by weight of at least one additive or supplement wherein the at least one additive or supplement does not act as nucleation agent;
wherein components (a) to (d) add up in total to 100% by weight of the polyamide moulding compound and carbon black is not a component of the polyamide moulding compound.

9. The polyamide moulding compound according to claim 1, wherein the polyamide is aliphatic and, after 2,000 hours high-temperature ageing at 230° C., has a tensile strength at break, determined according to ISO 527, of at least 60%, relative to the value, determined according to ISO 527, for the tensile strength before the high-temperature ageing and/or, after 2,000 hours high-temperature ageing at 230° C., has an elongation at break, determined according to ISO 527, of at least 50%, relative to the value, determined according to ISO 527, for the elongation at break before the high-temperature ageing.

10. The polyamide moulding compound according to claim 1, wherein the polyamide is partly aromatic and, after 3,000 hours high-temperature ageing at 180° C., has a tensile strength at break, determined according to ISO 527, of at least 69%, relative to the value, determined according to ISO 527, for the tensile strength at break before the high-temperature ageing and/or, after 3,000 hours high-temperature ageing at 180° C., has an elongation at break, determined according to ISO 527, of at least 63%, relative to the value, determined according to ISO 527, for the elongation at break before the high-temperature ageing.

11. A method for producing moulded articles made of a polyamide moulding compound, wherein a polyamide moulding compound according to claim 1 is extruded or injection-moulded.

12. A moulded article produced from a polyamide moulding compound according to claim 1.

13. A method for producing components with increased temperature requirements up to 230° C. comprising utilizing a polyamide moulding compound according to claim 1 in the production of the components.

14. The polyamide moulding compound according to claim 3, wherein polyamide (a) comprises 0.5 to 14% by weight of PA 6.

15. The polyamide moulding compound according to claim 4, wherein nigrosin (b) is comprised in 0.1 to 2% by weight.

16. The polyamide moulding compound according to claim 5, wherein the at least one nucleation agent (c) is comprised in 0.05 to 0.5% by weight.

17. The polyamide moulding compound according to claim 7, wherein the at least one additive (d) is comprised in 5 to 65% by weight.

* * * * *